Aug. 7, 1951 J. KRUITHOF ET AL 2,562,924

SUBSTATION CIRCUIT FOR REDUCING THE ATTENUATION OF LOW-FREQUENCY SIGNALS BY MEANS OF PARALLEL CONDENSORS

Filed July 23, 1947

Inventors
JAKOB KRUITHOF
LOUIS JACQUES GHISLAIN NYS

By Robert Harding Jr.
Attorney

Patented Aug. 7, 1951 2,562,924

UNITED STATES PATENT OFFICE 2,562,924

SUBSTATION CIRCUIT FOR REDUCING THE ATTENUATION OF LOW-FREQUENCY SIGNALS BY MEANS OF PARALLEL CONDENSERS

Jakob Kruithof and Louis Jacques Chislain Nys, Antwerp, Belgium, assignors to International Standard Electric Corp., New York, N. Y., a corporation of Delaware Application July 23, 1947, Serial No. 763,030
In the Netherlands August 14, 1942

Section 1, Public Law 690, August 8, 1946
Patent expires August 14, 1962

2 Claims. (Cl. 179—81)

This invention relates to telephone systems, and particularly to the conditions surrounding the reception of calls at subscriber stations on the system.

An object of the invention is to provide greater circuit efficiency during both the bell-ringing and the conversation stages of a telephone call.

Another object of the invention is to make possible an economy in current consumption while at the same time improving the clarity of reception, at the receiving station.

Figure 1:
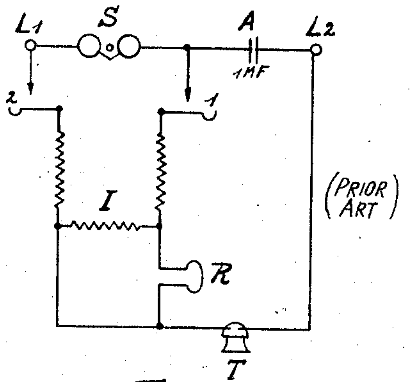
Figure 2:
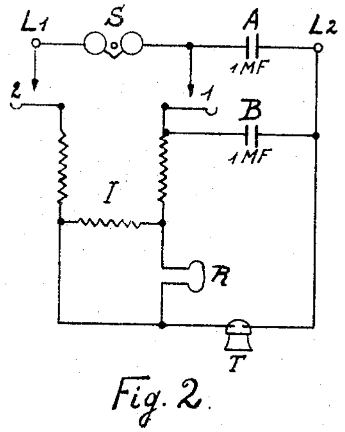

These and other objects of the present invention will be understood upon examination of the following description wherein is explained how the invention may be applied to a subscriber's telephone set connected to a central exchange circuit; Fig. 1 of the accompanying drawings showing such a subscriber's set as commonly wired, and Fig. 2 showing the wiring modified in accordance with the teaching of the present invention.

While the illustrated embodiment of the invention happens to show a subscriber's telephone set energized by battery current under the control of the central exchange equipment, it is to be understood that the invention is not limited thereto, or in any way other than by the scope of the appended claims.

There are a number of subscriber sets of known design, in which a condenser is used in the bell-ringing circuit; the same condenser also functioning for the talking circuit to the subscriber's receiver, as soon as the latter is lifted from the switch hook. Such an arrangement is shown in Fig. 1 of the drawings, wherein the subscriber set is illustrated as connected by means of terminals $L_1$ and $L_2$ to the line wires connecting with the central exchange. The bell S and the condenser A are always in series across these two line terminals. As soon as the subscriber set is switched into speaking condition (by lifting the receiver R from its hook) the contacts 1 and 2 of the gravity switch close, supplying microphone T with direct current from the exchange, and at the same time connecting receiver R in series with condenser A by way of the secondary winding of induction coil I and contact 1.

The disadvantage of this Fig. 1 arrangement is that the capacity of the condenser is necessarily either too large for the bell circuit (in which event the drain of ringing current is too heavy) or the capacity is too small for the talking circuit, in which event the clarity suffers because of the resulting high attenuation of the low frequencies. Thus there is inevitably a sacrifice, either of economy or of efficiency.

This disadvantage is circumvented by the present invention, which teaches the use of a different capacity for each situation, so that optimum circuit conditions may prevail during each stage of operation.

In Fig. 2 the invention is shown as applied to a subscriber set corresponding in some respects to that of Fig. 1. Now, however, a second condenser appears in the hook-up, as at B. This second condenser remains out of circuit during the ringing of the bell S, the bell-ringing circuit including only the condenser A, as in Fig. 1; but as soon as receiver R is removed from its hook the contacts 1 and 2 close and the condenser B is thereby connected in parallel with condenser A over the gravity-switch contacts 2. By the use of such a combination of condensers in different circuit branches, one in the bell circuit branch and the other outside it, it becomes possible to select for each successive operation—that is, first, the bell-ringing, and secondly the talking operation—the value of capacitance that is best suited to the prevailing conditions. In the example of Fig. 2 each condenser is assumed to have a capacity of one micro-farad; but with different circuit components and operating conditions, the values, of say, ½ mf. for condenser A and 2 mf. for condenser B might be more suitable.

In other words, the present invention makes it possible to apportion the values of the condensers in the subscriber sets in whatever way will yield most satisfactory results.

Instead of the parallel relationship shown for condensers A and B, there could be a series relationship, in which, for example, the condenser A would be in series with, first, the bell S and thereafter the contact 1, while condenser B would be in series with condenser A but in parallel relation to both the bell S and the contact 1. Again, the two condensers could be combined as a single unit, with only a portion of the full capacity in circuit during operation of the bell; the full capacity being employed, however, as soon as the receiver is lifted. Moreover, the central exchange may include automatic, semi-automatic, or merely manual controls, with or without batteries as the current source; the principles of the invention being incorporable with any of the forms which may be chosen for the associated equipment.

What is claimed is:

1. A telephone substation, comprising a line, a signalling circuit including a signalling device connected in series with a condenser directly across said line, said condenser being proportioned in capacity to a minimum consistent with efficient operation of said signalling device, which minimum capacity tends to undesirably attenuate low frequency talking signals, a talking circuit comprising a transmitter and receiver and including another condenser in circuit with said transmitter and receiver, switch means effective in one position to disconnect said talking circuit from said line and effective in another position to connect said talking circuit across said line while simultaneously connecting said other condenser in shunt across said first condenser to reduce said attenuation of the low frequency talking signals.

2. A telephone substation according to claim 1, in which said switch means connects said other condenser directly in shunt across the first condenser to decrease the capacitive impedance connected with said talking circuit across said line.

JAKOB KRUITHOF.
LOUIS JACQUES CHISLAIN NYS.

REFERENCES CITED

The following references are of record in the file of this patent:

UNITED STATES PATENTS

| Number | Name | Date |
|---|---|---|
| 1,551,171 | Powell | Aug. 25, 1925 |
| 1,687,695 | Pye | Oct. 16, 1928 |
| 1,752,429 | Fowler | Apr. 1, 1930 |
| 1,914,124 | Harper | June 13, 1933 |
| 1,930,537 | Pye | Oct. 17, 1933 |
| 2,134,690 | Allensworth | Nov. 1, 1938 |
| 2,375,791 | Johnson | May 15, 1945 |